Patented Mar. 8, 1949

2,464,053

UNITED STATES PATENT OFFICE 2,464,053

MIXTURE CONTAINING PENICILLIN

Allen L. Omohundro, Westport, and Milton J. Golden, New Haven, Conn., and Franz M. Neumeier, Corona, N. Y., assignors to McKesson & Robbins, Incorporated, Bridgeport, Conn., a corporation of Maryland No Drawing. Application March 19, 1945, Serial No. 583,642

7 Claims. (Cl. 167—58)

The present invention relates to a new and improved penicillin mixture.

Up to the present time, the accepted methods of administering penicillin are by intramuscular, intravenous and subcutaneous body injections. In the presence of moisture, the salts of penicillin are not stable, and undergo rapid deterioration with almost complete loss of activity within a few days or weeks. The instability of penicillin at ordinary temperatures and atmospheric conditions prevents the application of simpler and more painless methods of administering the penicillin.

An object of the present invention is to provide a new and improved penicillin product of substantial stability and in a form which lends itself readily and effectively to simple and painless therapeutic and prophylactic application.

In carrying out the features of the present invention, a salt of penicillin is mixed with a water-repellent powder base consisting of a water insoluble salt of a saturated monobasic fatty acid. By the incorporation of a salt of penicillin into a water insoluble salt of saturated monobasic fatty acid, a stable product is obtained which will retain its effective activity for a comparatively long time.

The salt of penicillin which may be used include those of the alkali metals such as sodium and potassium, those of the alkaline earth metals such as calcium, strontium and magnesium and those of ammonium. The water insoluble salt of saturated monobasic fatty acid, is that of an acid desirably having between 11 and 19 carbon atoms $C_{11}$ to $C_{19}$. This salt is desirably of the alkaline earth metals, as well as zinc and aluminum.

The following example illustrates a specific method of preparing the above compound in accordance with the invention.

Example

Fifty milligrams of the calcium salt of penicillin having a potency of 400 Oxford units per milligram are triturated with 100 grams of zinc stearate U. S. P. Xii, and passed through a #60 mesh Monel sieve. The resulting powder may be stored in a glass container at room temperature. This powder can be employed as a dusting powder.

To determine its activity, the powder is accurately weighed, suspended in a phosphate buffer of pH 6.6 to 7.0, such as a mixture of potassium phosphate monobasic and potassium phosphate dibasic, and then shaken thoroughly in such a dilution that the buffer extract contains about one Oxford unit per cubic centimeter. The potency is then determined by comparison with a calcium salt of penicillin standard of 370 Oxford units per milligram, supplied by the U. S. Food and Drug Administration.

The following data illustrates the stability of the calcium salt of penicillin in the powder base above described, permitting a 10% error for the assay method.

|  | Oxford units per gram |
|---|---|
| Originally contained | 216 |
| 2 weeks later | 225 |
| 3 weeks later | 198 |
| 4 weeks later | 200 |
| 7 weeks later | 203 |
| 8 weeks later | 190 |
| 11 weeks later | 206 |
| 12 weeks later | 180 |
| 16 weeks later | 176 |
| 5 months later | 192 |
| 6 months later | 180 |

This stabilization of the salts of penicillin by such water repellent salts of saturated monobasic fatty acids as stearic acid, will warrant the use of the mixture in such preparations as therapeutic dusting powders, enteric coated gelatin capsules, enteric coated pills, and enteric coated tablets. These enteric preparations are intended to be taken internally, and are in a form to prevent inactivation of the penicillin by the stomach secretions, and to make possible absorption of said penicillin in the intestines.

In the preparation of a powder mixture for enteric uses, the mixture is made substantially as described in connection with the preparation of a dusting powder, except that more units of penicillin are employed per gram of mixture. For example, in the preparation of a powder mixture for enteric capsules, the mixture may be such, that each gram of zinc stearate has incorporated therein about 10,000 Oxford units of a calcium salt or any suitable salt of penicillin. The same may apply to the preparation of powders for pills and tablets. The powder mixture prepared as described with the required amount of penicillin salt may be made in the usual well known manner into enteric coated gelatin capsules, enteric coated pills and enteric coated tablets.

While the invention has been described with particular reference to specific embodiments, it is to be understood that it is not to be limited thereto but is to be construed broadly and restricted solely by the scope of the appended claims.

What is claimed is:

1. A triturated mixture of a salt of penicillin and zinc stearate in sufficient proportions to substantially stabilize said salt of penicillin.

2. A triturated mixture of a calcium salt of penicillin and zinc stearate in sufficient amounts to stabilize said calcium salt.

3. A dusting powder for therapeutic use comprising a triturated mixture of a salt of penicillin stabilized with a water repellent, water insoluble salt of a saturated monobasic fatty acid having from eleven to nineteen straight chain carbon atoms and a metal selected from the group consisting of the alkaline earth metals, zinc and aluminum.

4. A dusting powder for therapeutic use comprising a triturated mixture of a salt of penicillin stabilized with zinc stearate.

5. A triturated mixture of a salt of penicillin and a water repellent alkaline earth metal salt of saturated straight chain monobasic fatty acid having from eleven to nineteen carbon atoms and in sufficient proportions substantially to stabilize said salt of penicillin.

6. A triturated mixture of a salt of penicillin and a water repellent zinc salt of saturated straight chain monobasic fatty acid having from eleven to nineteen carbon atoms and in sufficient proportions substantially to stabilize said salt of penicillin.

7. A triturated mixture of a salt of penicillin and a water repellent aluminum salt of saturated straight chain monobasic fatty acid having from eleven to nineteen carbon atoms and in sufficient proportions substantially to stabilize said salt of penicillin.

ALLEN L. OMOHUNDRO.
MILTON J. GOLDEN.
FRANZ M. NEUMEIER.

REFERENCES CITED

The following references are of record in the file of this patent:

UNITED STATES PATENTS

| Number | Name | Date |
|---|---|---|
| 1,638,700 | Molofsky | Aug. 9, 1927 |
| 1,950,957 | Wilhelm | Mar. 13, 1934 |
| 2,035,267 | Fleischman | Mar. 24, 1936 |
| 2,191,678 | Nitardy et al. | Feb. 27, 1940 |

OTHER REFERENCES

The Manufacturing Chemist, December 1943, page 374.

Merck's Index, 4th ed. (1930), page 555.